June 16, 1959 J. H. WIENS 2,891,108

AERIAL RECONNAISSANCE SYSTEM

Filed Aug. 3, 1953 3 Sheets-Sheet 1

JACOB H. WIENS,
INVENTOR.

BY Reed C. Lawlor
ATTORNEY.

AERIAL RECONNAISSANCE SYSTEM

Filed Aug. 3, 1953 3 Sheets-Sheet 2

JACOB H. WIENS,
INVENTOR.

BY Reed C. Lawlor
ATTORNEY.

June 16, 1959 J. H. WIENS 2,891,108

AERIAL RECONNAISSANCE SYSTEM

Filed Aug. 3, 1953 3 Sheets-Sheet 3

JACOB H. WIENS,
INVENTOR.

BY [signature]
ATTORNEY.

United States Patent Office 2,891,108

Patented June 16, 1959

2,891,108

AERIAL RECONNAISSANCE SYSTEM

Jacob H. Wiens, Redwood City, Calif., assignor of thirty percent to Reed C. Lawlor, Alhambra, Calif.

Application August 3, 1953, Serial No. 371,850

19 Claims. (Cl. 178—6.7)

My invention relates to surveying systems and more particularly to systems for surveying terrain from the air by employing television techniques. While my invention has application to other types of television and surveying systems, it is described below primarily with particular reference to aerial surveying.

In my prior patent application, Serial No. 189,614 filed by me October 11, 1950, now Patent No. 2,798,116, issued July 2, 1957, I have described and claimed a system for surveying terrain by scanning successive lineal segments of the earth over which an aircraft is flying successively modulating a radio frequency wave in accordance with the picture signals produced in the scanning process, and transmitting this modulated wave to a remote point where it is demodulated and the picture signals are integrated to produce a picture of the terrain. In that system the scanning is accomplished by means of a television camera tube employing a photosensitive surface and the scanning of the successive lineal segments of the earth is accomplished by repeatedly scanning a fixed lineal portion of the photosensitive surface.

At the present time the resolving power of the system described in my aforementioned patent application is limited by the number of picture elements that may be distinguished or detected along the line of the photosensitive surface that is being scanned. At the present time only about 800 to 1000 picture elements may be detected across the width of a camera tube. The limitation on the resolving power is due partly to the granular structure of the screen, partly to the electrical conductivity of the screen, partly to the light scattering characteristics of the screen, and partly to the size of the electron beam employed in scanning the screen.

One of the main advantages to the system disclosed in my aforementioned co-pending patent application resides in the fact that reconnaissance surveying may be accomplished by means of television principles without employing a wide band of frequencies. This advantage is attained in that system by virtue of the fact that each lineal segment of the terrain is scanned only once instead of being scanned repeatedly as would be the case if ordinary television systems employing raster scanning were utilized.

An object of my present invention is to provide an improved television system which possesses a higher resolving power than television systems which have been employed heretofore in reconnaissance surveying.

Another object of this invention is to provide an improved television system of high resolving power while still employing a relatively narrow band of frequencies for transmitting picture signals from a transmitter to a receiver.

Another object of this invention is to provide a television surveying system which employs a single camera tube to televise high-definition images of different zones of an object field or object area.

Another object of this invention is to provide a television surveying system in which lineal segments of different zones of an object field are scanned successively with a high degree of resolving power and in which the successive picture signals corresponding to the respective zones are integrated to form a composite picture of high definition.

Another object of this invention is to provide a system for forming with a single camera tube a plurality of picture signals of high definition that correspond to different zones of an object field being surveyed.

Another object of the invention is to provide an improved television system for producing picture signals corresponding to different zones of an object field.

Another object of this invention is to provide a receiver for segregating and integrating picture signals corresponding to different zones of an area being surveyed.

According to this invention, images of different zones of an object field are formed in different sectors of a photosensitive screen of a camera tube and the screen is scanned along a series of corresponding scanning lines in the different sectors in order to produce a corresponding plurality of picture signals. Each of the sectors extends transversely across the full length of the screen and the sectors of the photosensitive screen are arranged in parallel relationship along the longitudinal axis of the screen. As a result each zone is scanned with a high resolving power. The zones themselves extend longitudinally in the object field and lie in side-by-side relationship along a transverse axis.

An optical system is employed for focusing images of the various zones upon the respective sectors of the screen. Images of the zones move continuously across the corresponding scanning lines and successive lineal segments of the zones are scanned in the different sectors of the screen as the camera is flown over the area being surveyed. In this manner a plurality of series of picture waves are produced, one series corresponding to lineal segments of each zone. In the particular form of the invention described herein transverse lineal segments of the different zones are scanned in regular sequence and the picture signals modulate a single radio frequency wave that is emitted from the transmitter carried by the aircraft.

The modulated wave that is emitted by the transmitter is received at a remote point and is there employed to reconstruct an image of the area being surveyed. At the receiving point the series of picture waves are segregated and each of the series of picture waves is then reproduced in an image recorder in order to produce a picture of the corresponding zone and the pictures of the respective zones are integrated to produce a composite image of the area being surveyed.

My invention possesses numerous objects and features of advantage, some of which, together with the foregoing, will be set forth in the following description of specific apparatus embodying and utilizing my novel method. It is therefore to be understood that my method is applicable to other apparatus and I do not limit myself solely to the apparatus of the present specification, as I may adopt other apparatus embodiments utilizing the principles of my invention within the scope of the appended claims.

In the various figures, related graphs are generally shown one directly above another in order that the time relationship of various events represented by the graphs may be readily perceived.

*Introduction*

Figure 1:
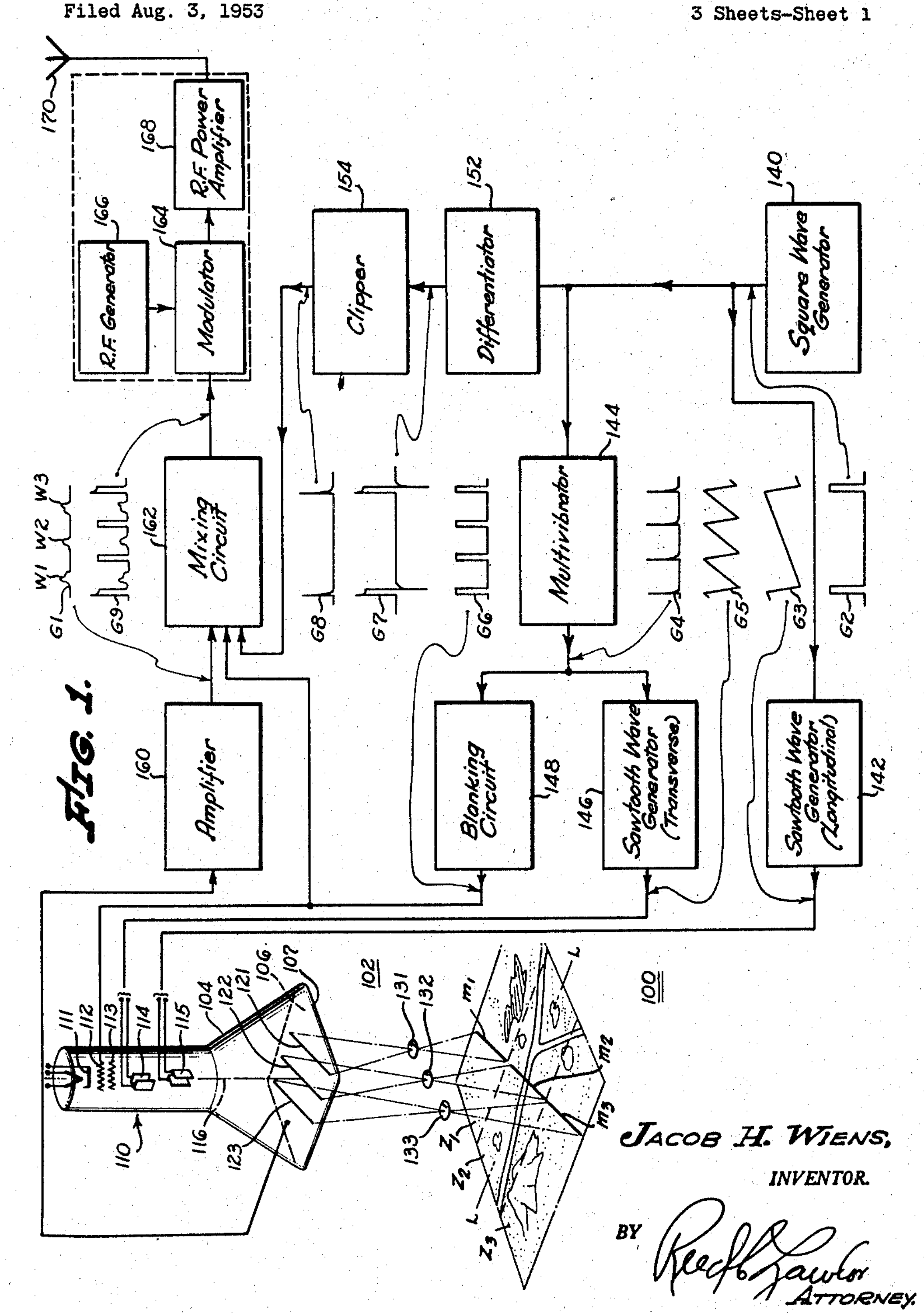
Figure 1 is a schematic diagram of a transmitter employing this invention.
Figures 2, 3:
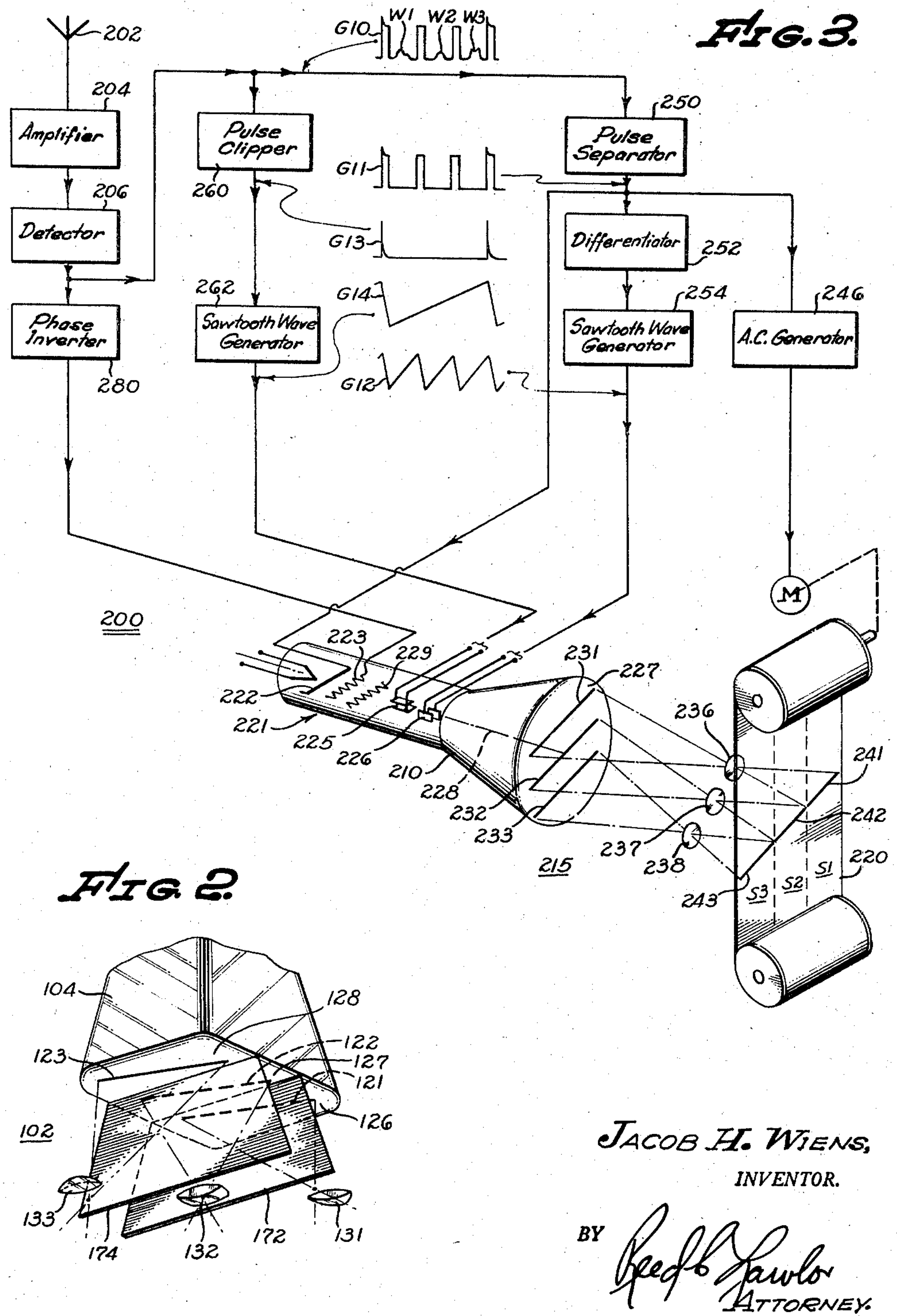
Fig. 2 is a fragmentary diagram of a television camera employed in this invention.
Fig. 3 is a schematic diagram of a receiver employed in this invention.
Figure 4:
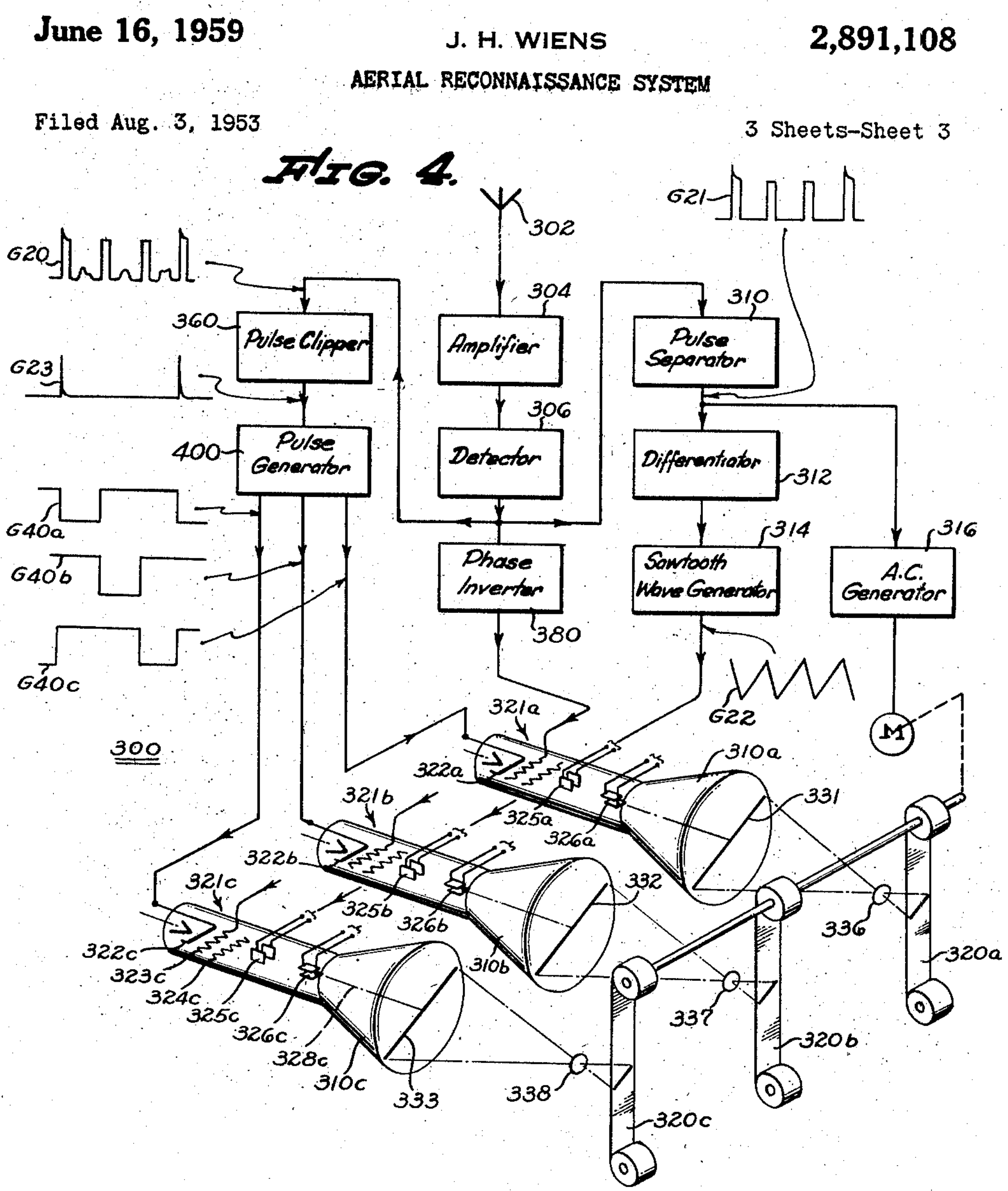
Fig. 4 is a schematic diagram of an alternative form of receiver employed in this invention.

The television surveying system for use with aircraft that is described herein employs a transmitter 100 as illustrated in Fig. 1 and either of the receivers 200 or 300 illustrated in Figs. 3 and 4 respectively. The transmitter 100 is mounted upon an aircraft and the receiver 200 or 300 is located at a home, or base, station on the ground. In the transmitter 100, different zones, $z_1$, $z_2$, and $z_3$, of the area being surveyed are separately scanned across the entire width of a camera tube so as to achieve high resolving power for all the zones. Corresponding picture signals produced by scanning the different zones are transmitted to the receiver 200 or 300. In the receiver 200 of Fig. 3 the picture signals are integrated to form an image of the area surveyed on a single film. In the receiver 300 of Fig. 4 images of the separate zones are formed on different corresponding strips of film. In both cases, images of higher definition are produced than has heretofore been possible.

*The transmitter*

The transmitter 100 comprises a multiple lens television camera 102 for forming high definition images of different parallel zones $z_1$, $z_2$ and $z_3$ that lie parallel to the course L—L along which the aircraft is flying, as shown in Fig. 1. The transmitter 100 also comprises electrical apparatus for modulating a carrier wave in accordance with three series of electrical picture waves each corresponding to a different zone of the terrain.

The television camera 102 comprises a camera tube 104 which includes a photosensitive screen 106 mounted on the interior of a transparent endface 107. The camera tube 104 comprises also an electrode system 110 that includes a cathode 111, a control electrode 112, a focusing electrode 113, a pair of transverse deflection plates 114, and a pair of longitudinal deflection plates 115, all arranged in sequence along an axis that is normal to the endface 107.

As more fully explained hereinafter sawtooth wave deflection voltages of a fundamental scanning frequency are applied to the longitudinal deflection plates 115 and sawtooth wave deflection voltages of three times that frequency are applied to the transverse deflection plates 114. As a result, as is well known, an electron beam 116 generated by the electrode system 110 repeatedly scans the screen 106 along three scanning lines 121, 122, and 123 successively. These lines are all parallel to each other and are inclined slightly to the transverse axis of the camera tube 104. The magnitude, or amplitude, of the sawtooth wave applied to the transverse deflection plates 114 is made large enough to cause the beam 116 to scan the screen 107 along the scanning lines 121, 122 and 123 throughout substantially the entire width of the screen in order that maximum definition may be attained. It will be noted that the scanning lines 121, 122, and 123 occupy different transverse sectors 126, 127 and 128, of the screen 106 which extend across the width of the screen in a direction generally parallel to the transverse axis, and that these sectors are arranged in side-by-side relationship along the longitudinal axis of the screen.

The television camera 102 includes three lenses 131, 132, and 133 that focus images of the different longitudinal zones $z_1$, $z_2$, and $z_3$ on the corresponding sectors 126, 127 and 128 and lineal images of segments $m_1$, $m_2$, and $m_3$ in the respective zones on the corresponding scanning lines 121, 122, and 123. As explained hereinafter, shields are employed to prevent light from any lens from reaching any sector of the screen 106 other than that upon which an image formed by that lens is to be focused. As the aircraft flies along its course, successive lineal segments of the three zones $z_1$, $z_2$, and $z_3$ are focused on the scanning lines 121, 122 and 123 and the images formed on these lines are successively scanned to form corresponding picture waves $W_1$, $W_2$, and $W_3$ as represented by the graph G1. In one form of the invention the three lenses 131, 132 and 133 are so mounted that collinear segments of the terrain in the three zones $z_1$, $z_2$, and $z_3$ are focused along the three scanning lines 121, 122 and 123 respectively. For simplicity, a detailed description of this one form of the invention is presented herein.

The scanning of the camera tube 104 is controlled by means of a square wave generator 140 that produces at its output square waves having a fundamental frequency equal to the frequency at which the photosensitive screen 106 is scanned. The square wave consists of a series of regularly recurring fundamental control pulses which are separated in time by an interval equal to the scanning period as illustrated in graph G3.

The output of the square wave generator 140 is employed to control the oscillation of a longitudinal sawtooth wave generator 142 which has a natural frequency of oscillation slightly less than the frequency of the square wave generator, thereby generating a sawtooth wave as represented in the graph G3. The resultant longitudinal deflection voltage appearing at the output of the sawtooth wave generator is applied to the longitudinal deflection plates 115. The sawtooth wave appearing at the output of this longitudinal sawtooth wave generator comprises a portion which changes slowly in one direction and a portion which changes rapidly in the other direction. Consequently the electron beam 116 traverses the screen 106 rapidly in one longitudinal direction and returns slowly in the other longitudinal direction at scanning frequency. By suitable selection of the circuit constants of the sawtooth wave generator, the duration of the rapidly changing portion is made equal to the duration of the fundamental control pulses.

The output of the square wave generator 142 also controls a multivibrator 144 which has a natural frequency slightly less than three times the frequency of the square wave generator 142. Sharp pulses appear at the output of the multivibrator 144 at intervals very nearly equal to one third of the scanning interval as indicated in the graph G4. Though the spacing between these pulses may vary slightly, nevertheless three such pulses appear at substantially regular intervals during each period of the fundamental square wave.

The output of the multivibrator 144 is employed to excite a transverse sawtooth wave generator 146 which accordingly produces at its output sawtooth waves having a frequency three times that of the scanning frequency as indicated by the graph G4. The voltage waves of triple frequency appearing at the output of the sawtooth wave generator 146 are applied to the transverse deflection plates 114 thereby causing the electron beam to traverse the screen 106 periodically in a transverse direction at three times the scanning frequency.

The sawtooth wave appearing at the output of the sawtooth wave generator 146 includes a portion which changes slowly in one direction and a portion which changes rapidly in the other direction. By suitably selecting the constants of the sawtooth wave generator 146 the duration of the rapidly changing section is made equal to the duration of the square wave control pulses. As a result the electron beam 116 sweeps slowly across the screen in a transverse direction at regular intervals and returns to the starting side of the screen relatively rapidly.

The output of the multivibrator 144 is also applied to a blanking circuit 148 which is designed to produce as its output square waves of triple frequency. By suitably selecting the circuit constants of the blanking circuit in a manner well known to those skilled in the art, negative pulses are produced at the output of the blanking circuit that have a duration equal to the time required for the electron beam 116 to return rapidly to its starting position at one side of the screen 106 as shown by graph G6.

The negative blanking pulses from the output of the blanking circuit 148 are applied to the control grid 112 of the camera tube in order to suppress the electron beam during the period of its return sweep to the starting side of the screen.

By virtue of the combined action of the two sawtooth wave generators and the blanking circuit, the electron beam 116 scans the screen 106 at regular intervals traversing the scanning lines 121, 122, and 123 successively once in each scanning interval. By synchronizing the operation of the sawtooth wave generators by methods well known in the art, the beam moves slowly in a transverse direction only while moving slowly in a longitudinal direction. Also by synchronizing the operation of the blanking circuit, the beam is cut off when moving rapidly in the opposite direction. As a result the corresponding segments, $m_1$, $m_2$, and $m_3$ of the zones $z_1$, $z_2$, and $z_3$ which are focused on the scanning lines 121, 122 and 123 are scanned regularly forming the corresponding picture waves $W_1$, $W_2$, and $W_3$.

It will be noted that the segments $m_1$, $m_2$ and $m_3$ of the terrain are not parallel to the scanning lines 121, 122 and 123, because of the fact that the image of the terrain is advancing across the photosensitive screen 106 during the time that the electron beam 116 is moving along the scanning lines. Regardless of this fact, successive segments of the terrain are, in effect, scanned by the camera tube 104 to produce corresponding picture waves. In an extreme case, if the electron beam has a longitudinal velocity across the photosensitive screen 106 equal to the longitudinal velocity of the image of the terrain across the screen, the segments scanned may lie along a line that is perpendicular to the course of flight. This result occurs when the electron beam scans the screen 106 slowly in the same direction that the image is moving across the screen and returns rapidly in the opposite direction. Ordinarily though, the longitudinal speed of the beam across the screen is much greater than the speed of the terrain across the screen and in this case the slope of the lines $m_1$, $m_2$, and $m_3$ on the terrain is very nearly the same as the slope of the scanning lines on the screen.

The output of the square wave generator 142 is also passed throrugh a differentiator 152 which produces at its output a wave represented by the graph G7. This wave is impressed upon a clipper 154 where its positive peaks are clipped and highly amplified thereby producing at its output synchronizing pulses at scanning frequency as indicated in the graph G8.

The electrical picture waves produced by the scanning of the photosensitive screen 106 are amplified by an amplifier 160. The blanking pulses from the blanking circuit 148 and the synchronizing pulses from the clipper 154 and also the amplified picture signals appearing at the output of the amplifier 135 are impressed upon the input of the mixing circuit 162 where they are combined to produce a composite signal as illustrated in graph G9 which is employed to modulate the carrier wave being transmitted. It will be noted that the blanking pulses alternate with the picture waves in this composite wave and that the synchronizing pulses are superimposed upon every third blanking pulse. The output of a mixing circuit is impressed upon a modulator 164 in which a carrier wave produced by a radio frequency generator 166 is modulated. The resultant modulated carrier wave is then amplified by the radio frequency power amplifier 168 and is then fed to an antenna 170 from which it is radiated to a receiver at a home or base station.

In order to obtain maximum resolving power with this invention, the scanning lines 121, 122 and 123 occupy substantially the entire width of the screen 106 in a direction transverse to the course of the aircraft. Inasmuch as a lineal segment of each zone is focused across the entire width of the photosensitive screen 106 the resolving power of the system is much higher than that of a single lens system. As a matter of fact, the resolving power increases at a rate about proportional to the square of the number of zones or scanning lines employed. Thus in the present instance the resolving power is increased about ninefold.

There are numerous ways that various longitudinal zones of the terrain being traversed may be focused on a series of longitudinally spaced transverse sectors of a camera tube without overlapping and without gaps between the zones. In case three separate lenses of the same focal length are employed as indicated in Fig. 1 suitable division of the terrain into such parallel zones may be achieved by mounting the lenses at positions at which the spaces between the lenses subtend angles at the screen 106, equal to the angle subtended by the respective scanning lines 121, 122 and 123 at the centers of the lenses. This result is accomplished by arranging the lenses in a spaced apart relationship with the transverse components of the distances between them substantially equal to the transverse components of the lengths of the scanning lines 121, 122 and 123. If it is desired to assure complete coverage of the terrain in the survey, the transverse component of the spacing between adjacent lenses may be slightly less than the transverse component of the lengths of the scanning lines. In this case the linear segments of the ground that are scanned by the respective adjacent scanning lines 121 and 122 and adjacent scanning lines 122 and 123 overlap slightly.

In addition, if it is desired to scan collinear lineal segments of the various zones the displacements between successive lenses 131, 132 and 133 in a longitudinal direction are made slightly less than equal to the longitudinal components of the displacement between successive scanning lines 121, 122 and 123.

In Fig. 2 there is illustrated an optical system in which the lenses 131, 132 and 133 are formed by segments of a single lens. In this case, following the principles explained above the transverse component of the spacing between the optical centers of adjacent lens segments is slightly less than the effective width of the screen 106 and the optical centers of the various lens segments are spaced apart longitudinally by distances equal to the longitudinal distances between the scanning lines 121, 122 and 123. In order to prevent light from any of the lens segments of the system of Fig. 2 from falling upon a noncorresponding sector of the screen shields are employed. One of the shields 172 terminates at its lower end between the two lens segments 131 and 132, and at its upper end in the space between the two corresponding scanning lines 121 and 122. Likewise the other shield 174 terminates at its lower end in the space between the two lens segments 132 and 133 and at its upper end in the space between the two corresponding scanning lines 122 and 123. The shields 172 and 174 may be in the form of opaque sheets having black surfaces. The upper ends of these shields define the boundaries between the sectors 126, 127 and 128 of the screen upon which images of the corresponding zones $z_1$, $z_2$, and $z_3$ are focused. The shields 172 and 174 may be inclined in a direction to make them less oblique to the scanning lines to assure that the scanning lines shall remain within the proper sectors even if the amplitude of the longitudinal sawtooth wave varies from its standard value.

It is thus seen that with the optical system and scanning system of Fig. 1 a composite picture wave is produced that possesses a series of components each corresponding to a different zone of the terrain and each having the maximum amount of picture information that can be obtained in a single scan across the width of the camera tube employed. It thus appears that if a maximum of 1000 picture elements can be detected across the width of the screen of the camera tube then by means of the system described above information corresponding to 3000 picture elements disposed across the terrain may be represented in the signal.

*Single film recorder*

The modulated carrier wave arriving at the receiver 200 of Fig. 3 is picked up by a receiving antenna 202 and is then amplified by a suitable radio frequency amplifier 204, and the amplified wave is demodulated by means of a detector 206 in order to reconstruct the composite wave G9, as indicated at the output of the detector by the graph G10. The detector output is applied to a cathode ray tube 210 of a recorder 215 in order to produce upon a single strip of film 220 a single image of the terrain with the separate images of the various zones $z_1$, $z_2$, and $z_3$ properly integrated in side-by-side relationship.

The cathode ray tube 210 comprises an electrode system 221 including a cathode 222, a signal grid 223, a focusing electrode 224, a pair of vertical, or longitudinal, deflection plates 225 and a pair of transverse, or horizontal deflection plates 226. An electron beam 228 generated by the electrode system 221 is accelerated in the conventional manner toward a cathode ray screen 227 at the end of the cathode ray tube to cause the screen to become illuminated at the points of impingement of the beam in accordance with the intensity of the beam.

According to the present invention the picture waves $W_1$, $W_2$, and $W_3$ of the composite wave are separately converted into visible images on the screen 227, each being reproduced across the entire width of the screen along corresponding reproducing lines 231, 232 and 233. The images reproduced along these lines are focused by means of corresponding lenses 236, 237 and 238 on reproduction lines 241, 242, and 243 on the film 220 to produce a single line image of the terrain.

The output of the detector 206 is employed to regenerate sawtooth wave control voltages that are synchronized with those employed in the transmitter 100. More particularly, the output of the detector 206 as represented by the graph G10 is passed through a pulse separator 250 which removes from the composite signal the various picture waves and produces at its output a signal representing the blanking pulses combined with the synchronizing pulses as indicated by curve G11. The output of the pulse separator 250 is passed through a differentiator 252 to the input of a sawtooth wave generator 254 which is tuned to oscillate at a frequency slightly less than the triple frequency employed in the transmitter. The sawtooth wave generator 254 is designed to produce at its output a sawtooth wave as represented by the curve G12 which has a slowly changing portion and a rapidly changing portion of durations respectively equal to those at the output of the transverse sawtooth wave generator 146 of the transmitter. Thus the transverse deflection voltage wave employed on the transmitter is reproduced at the receiver. This voltage is applied to the horizontal deflection plates 226 to cause the electron beam 228 to sweep horizontally across the screen 227 of the cathode ray tube 210 in synchronism with the transverse movement of the electron beam 116 across the face of the camera tube 104.

The output of the detector 206 is also passed through a pulse clipper 260 to produce at its output a series of synchronizing pulses of fundamental or scanning frequency as indicated by curve G13. These pulses are employed to actuate a sawtooth wave generator 262 which is tuned to oscillate at a frequency slightly below scanning frequency. The constants of the sawtooth wave generator 252 are so chosen that the output of this generator has the same shape as the longitudinal deflection voltage G3 employed in the transmitter, as indicated by graph G14. The output of the sawtooth wave generator 252 is applied to the longitudinal deflection plates 225 to cause the electron beam 228 to sweep vertically across the screen 227 of the cathode ray tube 210 in synchronism with the vertical movement of the electron beam across the face of the camera tube 104.

The synchronizing pulses indicated by the graph G13 thus synchronize the scanning voltages of the recorder tube 210 with those of the camera tube 104. Thus the electron beam 228 scans the three lines 231, 232, and 233 on the face of the cathode ray tube 210 in a manner similar to that in which the lines 121, 122 and 123 on the face of the camera tube 104 are scanned.

The output of the pulse separator is also applied to an A.C. generator 256 which drives a motor M thereby moving the film 220 at a constant speed past the lenses 236, 237 and 238.

In addition the output of the pulse separator 250 is applied to the cathode 222 thereby suppressing the electron beam 228 in the intervals during which the electron beam is returning rapidly to the starting side, that is during the time that picture waves $W_1$, $W_2$, and $W_3$ are not modulating the electron beam, and gating the beam when the picture waves are modulating it.

The composite wave appearing at the output of the detector is also passed through a phase inverter 280 and is applied to the signal control grid 223. Consequently the intensity of the electron beam 228 varies in proportion to the illumination of the photosensitive screen 106 at the point thereof at which the electron beam 116 is directed.

The screen 106 of the camera tube 104 and the screen 227 of the recorder tube 210 are, in effect, divided into similarly spaced sectors. And the two sets of scanning lines 121, 122 and 123 of the camera tube and the set of scanning lines 231, 232, and 233 of the recording tube are similarly orientated on the faces of the respective tubes. Accordingly as the two electron beams 116 and 228 scan the corresponding screens in synchronism, images of the segments $m_1$, $m_2$, and $m_3$ of the terrain are reproduced in visible form on the scanning lines 231, 232 and 233 of the recorder tube 210. These visible images are focused by the lenses 236, 237 and 238 along a common line that extends transversely of the film 220 thereby reproducing on the film an accurate image of the line of the terrain along which the segments $m_1$, $m_2$, and $m_3$ are located.

It will be noted that the optical system of the recorder 215 is very similar to the optical system of the television camera 102. The lenses are differently positioned in the two cases because of the large differences in the ratios of the back-focal lengths to the front-focal lengths.

As the aircraft carrying the television camera 102 flies along its course over the terrain, successive segments of the respective zones of the terrain are photographed in succession along corresponding similarly disposed strips $S_1$, $S_2$, and $S_3$ of the film 220. The proper integration of the images of the various segments of the terrain is accomplished in part by the proper placement of the lenses 236, 237 and 238 and in part by the movement of the film 220. The correct positioning of the lenses depends upon the lengths of the scanning lines 231, 232 and 233, the width of the film 220, the focal length of the lenses, and the distance between the film and the cathode ray tube, and may be readily accomplished by means of well known principles of optics.

In the recorder 215 as shown, it is assumed that the emulsion is on the side of the film closer to the cathode ray tube and that the picture is to be viewed through the body of the film and that the film is moving in such a direction as to produce a picture in which the various parts of the terrain are in the correct relative positions as viewed from the air. If the picture is to be viewed from the other side as when an opaque recording medium is employed, correct orientation of the picture may be obtained merely by reversing the polarity of the vertical deflection voltage wave.

An accurately scaled, undistorted, integrated strip photograph is produced on the film 220 by operating the motor M at an appropriate speed corresponding to the rate of travel of the aircraft along its flight course. The speed of the film is so set that the scale of the picture is the same in a longitudinal direction as in a transverse direction. As explained more fully in the aforementioned patent application compensation for variations in the speed of flight may be obtained by varying the frequency of the square wave generator of the transmitter in proportion to the flight speed.

*Multiple film recorder*

In another system for surveying the terrain, images of the different zones are formed on separate films and subsequently the films are placed side by side to form a composite image of the terrain. This system, which is illustrated in Fig. 4, is similar to that illustrated in Fig. 3 but is modified to employ three cathode ray tubes and three films. Accordingly, where identical elements are employed, they are designated by the same numerical legend increased by one hundred and where triplicate elements are employed they are distinguished by the suffixes *a*, *b*, and *c*. Likewise similar graphs are designated by the same numerals increased by ten.

In the system of Fig. 4, the modulated wave arriving at the receiver 300 is picked up by a receiving antenna 302 and amplified in a radio frequency amplifier 304 the output of which is demodulated by means of a detector 306.

In this system three cathode ray tubes 310*a*, 310*b* and 310*c* are employed, and the picture waves $W_1$, $W_2$, and $W_3$ are segregated and reproduced as separate images on the faces of the corresponding cathode ray tubes. Thus on the face of the respective cathode ray tubes there are reproduced images corresponding to the lineal segments of the respective zones $z_1$, $z_2$, and $z_3$ of the terrain. Lenses 336, 337 and 338 are employed to focus the images formed on the faces of the respective cathode ray tubes on the corresponding strips of film 320*a*, 320*b* and 320*c*. Each of the cathode ray tubes comprises a corresponding electrode system 321*a*, 321*b* and 321*c* each of which includes a corresponding cathode 321*a*, 322*b* and 322*c*, a corresponding control grid 323*a*, 323*b* and 323*c*, a corresponding focusing electrode 324*a*, 324*b* and 324*c*, a corresponding pair of horizontal deflection plates 325*a*, 325*b* and 325*c*, and a corresponding pair of vertical centering plates 326*a*, 326*b* and 326*c*. Electron beams 328*a*, 328*b* and 328*c* are accelerated in conventional manner toward the corresponding luminescent screens 327*a*, 327*b* and 327*c* respectively where they cause the screens to become illuminated at the points of impingement of the beams in accordance with the intensities of the beams.

The demodulated output of the detector 306 which is represented in graph G20 is passed through a pulse separator 310 to form pulses as indicated by the graph G21. These pulses are passed through a differentiator 312 and applied to a sawtooth wave generator 314 in order to produce horizontal deflection voltages of triple frequency as indicated in graph G22. These deflection voltages are applied to the horizontal deflection plates 325*a*, 325*b*, and 325*c* of the cathode ray tubes 310*a*, 310*b* and 310*c*.

Steady centering voltages are applied to the vertical deflection plates 326*a*, 326*b* and 326*c*.

The output of the pulse separator is also applied to an A.C. generator 316 which drives a motor M which advances the three strips of film 320*a*, 320*b* and 320*c* past the lenses 336, 337 and 338.

The output of the detector also is passed through a pulse clipper 360 which generates at its output a series of synchronizing pulses of scanning frequency as indicated by the graph G23. The synchronizing pulses are applied to a polyphase pulse generator 400 which produces at its output three square waves represented by graphs G40*a*, G40*b* and G40*c*, each of which includes a negative pulse that has a duration equal to one third of the scanning period and a succeeding positive or zero pulse of a duration of two thirds of the scanning period. The three negative pulses are generated in sequence and in synchronism with the sweep of the electron beams across the screens of the cathode ray tubes 310*a*, 310*b* and 310*c*. Anyone of many polyphase pulse generators that have been developed in the past could be employed. Such a pulse generator is shown at page 22 of the May 1950, issue of "Electronics" magazine.

The various outputs of the pulse generator are applied to the cathodes 322*a*, 322*b* and 322*c* of corresponding cathode ray tubes 310*a*, 310*b*, and 310*c*. With this arrangement as the three negative pulses are applied in turn to the cathode ray tubes, the electron beams are gated thereby causing images to be formed on the faces of the corresponding tubes. In this way the picture waves $W_1$, $W_2$, and $W_3$ are segregated and reproduced as visible images on the screens 327*a*, 327*b* and 327*c* of the corresponding tubes.

The three films 320*a*, 320*b* and 230*c* are driven in unison by the motor M so that successive lineal segments of the various zones are reproduced in succession along the lengths of the respective films.

For best results, the cathode ray tubes 310*a*, 310*b* and 310*c* are rotated about their axes so that the scanning lines along which the picture waves are reproduced form an angle with the width of the films which is equal to the angle that the scanning lines 121, 122 and 123 form with a transverse axis of the camera tube 104. When separate images of the zones are reproduced in this manner the separate strips of film may be placed in side-by-side relationship to form an accurate composite image of the terrain being surveyed.

*Modifications*

Though only one specific form of transmitter and only two specific forms of receivers have been described above, it will be obvious that many modifications may be made therein while still employing this invention within the scope of the appended claims. Examples of such modifications are indicated below.

In the form of the invention described herein, the area being surveyed has been divided into three parallel longitudinal zones and images of series of segments of these zones have been produced at the receiver. It will be clear, of course, that the area being surveyed may be divided into a different number of zones, either two or four or more, and images of the zones may be similarly produced at a receiver. In order to achieve this result transverse, sawtooth waves are generated at a frequency twice or four times or some other multiple of the fundamental frequency of the longitudinal sawtooth wave voltage. To modify the transmitter to accomplish this purpose the natural frequency of the multivibrator is set slightly lower than the frequency at which the electron beam is to scan the photosensitive screen in a transverse direction. Other circuit constants of the transmitter may be modified in order to facilitate synchronization of the various waves. If the area being surveyed is divided into a different number of zones than three then a different number of lenses are employed both in the television camera and in the recorder, the number of lenses in each being the same as the number of zones into which the surveyed area is divided. No particular modification is required in the form of the electrical apparatus of the receiver illustrated in Fig. 3 except for suitable selection of circuit constants to facilitate operation at the frequencies required. But if the receiver of Fig. 4 is employed, a number of cathode ray tubes and films are used which equal the number of zones. Also the polyphase pulse generator is designed to produce a corresponding number of pulses.

Also in the specific form of the invention described, the scanning lines in the camera and in the recorder are in the form of straight lines inclined slightly to the transverse axis of the tubes. It will be understood of course that other orientations and configurations of scanning lines may be employed, it not even being necessary that the lines be straight. In any event, however, in order to achieve a high resolving power the scanning lines extend over a large portion of the screen and the total length of all the scanning lines added together is greater than the width of the screens generally being at least about twice the width of the screen. In the form of the invention shown, the scanning lines on the camera screen are substantially coextensive in a transverse direction. However the advantages of the invention may also be obtained if the scanning lines do not extend across the entire screen but only overlap a longitudinal area thereof that has a width which is a substantial fraction of about one third or more of the screen width. Also, though the camera screen shown is of rectangular configuration, screens of circular and other shapes may be employed.

In the specific form of the invention described herein the various sectors of the photosensitive screen have been scanned successively and the corresponding sequence of picture waves have been employed to modulate a carrier wave of a single frequency. The invention may also be practiced by scanning the various sectors of the photosensitive screen simultaneously and modulating a corresponding plurality of carrier waves of different frequencies with the respective picture signals. In this case separate receivers tuned to the respective carrier frequencies are employed to detect the picture signals corresponding to the various zones being scanned. The invention may also be practiced by mounting a recording system directly upon the aircraft that carries the camera. In this case the recording system is operated in synchronism with the camera by means of direct connections, to form a single composite picture of high definition of the area surveyed.

In order to practice the invention, it is not necessary for the segments that are scanned in sequence in the various zones to be collinear. Even if they are not collinear, images of the separate zones are produced and an integrated picture of the entire area surveyed is obtained by placing the images of the respective zones in proper registry in side-by-side relationship. With the single film recorder, the registration may be accomplished optically; with the multiple film recorder, it may be accomplished optically or by marking the edges of the films. Also, of course, the invention may be practiced by scanning different lines of the sectors of the photosensitive screen and the sectors of the cathode ray tubes at the receiver at different rates and even at a frequency which is not an integral multiple of the fundamental frequency of the longitudinal sawtooth wave scanning voltage. However, best results are obtained by scanning the cathode ray tubes in the recorder in synchronism with the scanning of the camera.

Also it will be understood that it is not necessary to make a permanent photograph of pictures of the terrain being surveyed, but that the invention may be practiced by displaying the images in other ways.

From the foregoing it will be clear that the invention is not limited to the specific embodiments thereof illustrated and described therein, or even to the specific modifications thereof that have been mentioned above. Accordingly, it will be understood that various changes which will now suggest themselves to those skilled in the art may be made in the form, details of construction, circuit constants and arrangement of the elements without departing from the invention as defined in the claims.

I claim:

1. In a system for surveying terrain, a camera tube having a plurality of photosensitive screen portions, said screen portions being spaced apart in a first, or longitudinal, direction, each of said screen portions extending in a second, or transverse, direction, means for focusing transverse segments of different laterally spaced longitudinal zones of an object field being surveyed on corresponding screen portions, and means for successively scanning the images that are focused on said screen portions along transverse lines thereof, whereby series of electrical picture signals corresponding to the respective zones are produced.

2. In a system for surveying terrain, a camera tube having a plurality of photosensitive screen portions, said screen portions being spaced apart in a first, or longitudinal, direction, each of said screen portions extending in a second, or transverse, direction, means for focusing transverse segments of different laterally spaced longitudinal zones of an object field being surveyed on corresponding transverse scanning lines on the respective screen portions, means for scanning the images formed on said transverse lines, whereby series of electrical picture signals corresponding to the respective zones are produced, and means for advancing images of said zones longitudinally across the corresponding scanning lines while said lines are being scanned.

3. In a system for surveying terrain, a camera tube having a plurality of photosensitive screen portions, said screen portions being spaced apart in a first, or longitudinal, direction, each of said screen portions extending in a second, or transverse, direction, means for focusing transverse segments of different laterally spaced longitudinal zones of an object field being surveyed on corresponding screen portions, means for successively scanning the images that are focused on said screen portions along transverse lines thereof, whereby series of electrical picture signals corresponding to the respective zones are produced, and means for converting the respective series of picture signals into separate images of the corresponding zones of the object field.

4. In a system for surveying terrain, a camera tube having a plurality of photosensitive screen portions, said screen portions being spaced apart in a first, or longitudinal, direction, each of said screen portions extending in a second, or transverse, direction, means for focusing transverse segments of different laterally spaced longitudinal zones of an object field being surveyed on corresponding screen portions, means for successively scanning the images that are focused on said screen portions along transverse lines thereof, whereby series of electrical picture signals corresponding to the respective zones are produced, means for converting said electrical picture waves into corresponding optical images, and means for photographing the optical images corresponding to different zones to produce pictures of said zones.

5. In a system for surveying terrain, a camera tube having a plurality of photosensitive screen portions, said screen portions being spaced apart in a first, or longitudinal, direction, each of said screen portions extending in a second, or transverse, direction, means for focusing transverse segments of different laterally spaced longitudinal zones of an object field being surveyed on corresponding screen portions, means for successively scanning the images formed on said screen portions along transverse lines thereof, whereby series of picture signals corresponding to the respective zones are repeatedly produced in succession, a source of radio-frequency waves of a predetermined carrier frequency, means for modulating said radio-frequency waves in accordance with said series of picture signals, means for receiving said modulated radio-frequency waves, means for demodulating said received radio-frequency waves, and means controlled by said received wave for reproducing separate series of electrical picture waves corresponding to the respective zones of the object field.

6. In a system for surveying terrain, a camera tube having a plurality of photosensitive screen portions, said screen portions being spaced apart in a first, or longitudinal, direction, each of said screen portions extending in a second, or transverse, direction, means for focusing transverse segments of different laterally spaced longitudinal zones of an object field being surveyed on corresponding screen portions, means for successively scanning the images formed on said screen portions along transverse lines thereof, whereby series of picture signals corresponding to the respective zones are repeatedly produced in succession, a source of radio-frequency waves of a predetermined carrier frequency, means for modulating said radio-frequency waves in accordance with said series of picture signals, means for receiving said modulated radio-frequency waves, means for demodulating said received radio-frequency waves, means controlled by said received wave for reproducing separate series of electrical picture waves corresponding to the respective zones of the object field, and means for converting the respective series of picture signals into separate images of the corresponding zones of the object field.

7. In a system for surveying terrain, a camera tube having a plurality of photosensitive screen portions, said screen portions being spaced apart in a first, or longitudinal, direction, each of said screen portions extending in a second, or transverse, direction, means for focusing transverse segments of different laterally spaced longitudinal zones of an object field being surveyed on corresponding screen portions, means for successively scanning the images that are focused on said screen portions along transverse lines thereof, whereby series of electrical picture signals corresponding to the respective zones are produced, a cathode ray tube having a luminescent screen, means for converting said electrical picture waves into corresponding visible images on said luminescent screen, means for focusing said visible images on corresponding transversely disposed areas of a film, and means for driving said film past said luminescent screen.

8. In a system for surveying terrain, a camera tube having a plurality of photosensitive screen portions, said screen portions being spaced apart in a first or longitudinal, direction, each of said screen portions extending in a second, or transverse, direction, means for focusing transverse segments of different laterally spaced longitudinal zones of an object field being surveyed on corresponding screen portions, means for successively scanning the images that are focused on said screen portions along transverse lines thereof, whereby series of electrical picture signals corresponding to the respective zones are produced, a plurality of cathode ray tubes having luminescent screens, means for converting said electrical picture waves into corresponding visible images on said luminescent screens, means for focusing said visible images on transversely disposed areas of corresponding films, and means for driving said films past said luminescent screens.

9. In a television camera, a camera tube having a plurality of photosensitive screen portions, said screen portions being spaced apart in a first, or longitudinal, direction, each of said screen portions extending in a second, or transverse, direction, means for scanning a transverse line in each of the respective screen portions, and a plurality of optical elements of the same focal length for focusing segmental images of different longitudinally extending zones of an object field on the respective scanning lines, the transverse component of the angle between the optical centers of adjacent optical elements being approximately equal to the transverse component of the angle formed by each of said scanning lines at the centers of the optical elements, the longitudinal spacing of the optical centers of said optical elements being about the same as the longitudinal spacing of said scanning lines.

10. In a television receiving system, a cathode ray tube having an extended luminescent screen, means for scanning a plurality of scanning lines that are spaced apart on said screen in a first, or longitudinal, direction and that extend across said screen in a second, or transverse, direction, and means for focusing images appearing on said scanning lines on corresponding reproduction lines on a film that extend transversely of the length of the film, said latter lines being arranged in different transversely disposed longitudinal zones of the film.

11. In a television system, a camera tube having a photosensitive screen, said screen comprising a plurality of transversely extending portions, said screen portions being spaced apart in a first, or longitudinal, direction, each of said screen portions extending in a second, or transverse, direction, means for directing a scanning beam toward said photosensitive screen, a cathode ray tube having a luminescent screen comprising a plurality of luminescent portions corresponding to the portions of said photosensitive screen, each of said luminescent portions being spaced apart in a first, or longitudinal, direction corresponding to the first, or longitudinal, direction of said photosensitive screen portions, each of said luminescent portions extending in a second, or transverse, direction correponding to the second, or transverse, direction of said photosensitive screen portions, means for directing a scanning beam toward said luminescent screen, means for focusing segments of different laterally spaced, longitudinally extending zones of an object field being surveyed onto corresponding screen portions of said camera tube, means for synchronously scanning corresponding portions of the respective screens, and means controlled by electrical picture signals generated by the scanning of said photosensitive screen for modulating the intensity of the electron beam in said cathode ray tube.

12. In a system for surveying terrain as defined in claim 11, means for focusing images appearing in the respective portions of the luminescent screen onto corresponding transversely disposed areas of a film.

13. In a system for surveying terrain as defined in claim 11, means for transporting said camera tube and said focusing means over an area to be surveyed, whereby successive segments of said zones are scanned.

14. In a system for surveying terrain as defined in claim 11, means for focusing images appearing in the respective portions of the luminescent screen onto corresponding transversely disposed areas of a film, means for transporting said camera tube and said focusing means over an area to be surveyed, whereby successive segments of said zones are scanned, and means for advancing said film longitudinally past said latter images.

15. In a television camera, a camera tube having a plurality of photosensitive screen portions, said screen portions being spaced apart in a first, or longitudinal, direction, each of said screen portions extending in a second, or transverse, direction, means for scanning a transversely extending line in each of the respective screen portions, and a plurality of optical elements for focusing images of different parts of an object field on the respective screen portions, the optical elements being so disposed as to focus a series of contiguously arranged, longitudinal zones of the object field on corresponding longitudinally spaced apart screen portions.

16. In a television camera, a camera tube having a plurality of photosensitive screen portions, said screen portions being spaced apart in a first, or longitudinal, direction, each of said screen portions extending in a second, or transverse, direction, means for scanning a transversely extending line in each of the respective screen portions, and a plurality of optical elements of the same focal length for focusing segmental images of an object field on the respective scanning lines, the transverse component of the angle between the optical centers of adjacent optical elements as measured from a point on said screen being approximately equal to the transverse component of the angle formed by each of said lines at the centers of the optical elements.

17. In a system for surveying terrain, a camera tube providing a beam and including beam deflection means for sweeping the beam in longitudinal and transverse directions, means for providing sweep signals at a fundamental frequency and for applying the sweep signals to said beam deflection means to produce a succession of longitudinal sweeps of the beam, means for providing sweep signals at a harmonic frequency and for applying the latter sweep signals to said beam deflection means to produce a plurality of transverse sweeps of the beam for each longitudinal sweep, means for forming images of transverse segments of different longitudinal zones of such terrain, successive transverse sweeps of the beam being directed to images of transverse segments of different longitudinal zones of the terrain, and means controlled by the transverse sweeps for producing sequences of signals representing segments of the different longitudinal zones of the object field for each longitudinal sweep of the beam.

18. In a system for surveying terrain, a camera tube providing a beam and including beam deflection means for sweeping the beam in longitudinal and transverse directions, means for providing sweep signals at a fundamental frequency and for applying the sweep signals to said beam deflection means to produce a succession of longitudinal sweeps of the beam, means for providing sweep signals at a harmonic frequency and for applying the latter sweep signals to said beam deflection means to produce a plurality of transverse sweeps of the beam for each longitudinal sweep, means including a lens system for focusing the beam in successive transverse sweeps on different transverse segments of different longitudinal zones of an object field for each longitudinal sweep of the beam, and means for producing sequences of signals representing the different zones for each longitudinal sweep of the beam.

19. In a system for surveying terrain, means for providing a beam and including beam deflection means for sweeping the beam in longitudinal and transverse directions, means for providing sweep signals at a fundamental frequency and for applying the sweep signals to said beam deflection means to produce a succession of longitudinal sweeps of the beam, means for providing sweep signals at a harmonic frequency and for applying the latter sweep signals to said beam deflection means to produce a plurality of transverse sweeps of the beam for each longitudinal sweep, means including a plurality of optical devices corresponding in number to the ratio between the harmonic and fundamental frequencies for forming images of transverse segments of different transversely spaced apart longitudinal zones of the terrain, each optical device having a characteristic such that the beam is focused along transverse segments of different longitudinal zones of an object field during the respective transverse sweeps, means for producing sequences of signals representing segments of different zones surveyed by the successive transverse sweeps, means for transmitting the sequences of signals, means for receiving the sequences of signals, and means for translating the received signals to indicate the object field.

References Cited in the file of this patent

UNITED STATES PATENTS

| | | |
|---|---|---|
| 2,157,749 | Du Mont | May 9, 1939 |
| 2,288,871 | Adams | July 7, 1942 |
| 2,293,899 | Hanson | Aug. 25, 1942 |
| 2,294,820 | Wilson | Sept. 1, 1942 |
| 2,531,031 | De France | Nov. 21, 1950 |
| 2,638,498 | De France | May 12, 1953 |